(12) United States Patent
Ogawa et al.

(10) Patent No.: US 8,678,153 B2
(45) Date of Patent: Mar. 25, 2014

(54) TWIN-CLUTCH DEVICE

(75) Inventors: Hiroyuki Ogawa, Susono (JP); Akira Murakami, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 527 days.

(21) Appl. No.: 13/002,853

(22) PCT Filed: Jul. 8, 2009

(86) PCT No.: PCT/IB2009/006187
§ 371 (c)(1),
(2), (4) Date: Jan. 6, 2011

(87) PCT Pub. No.: WO2010/004410
PCT Pub. Date: Jan. 14, 2010

(65) Prior Publication Data
US 2011/0127133 A1    Jun. 2, 2011

(30) Foreign Application Priority Data
Jul. 9, 2008  (JP) .................................. 2008-179545

(51) Int. Cl.
| | |
|---|---|
| F16D 37/02 | (2006.01) |
| F16D 47/06 | (2006.01) |
| F16D 21/06 | (2006.01) |
| F16D 27/01 | (2006.01) |
| F16D 27/12 | (2006.01) |

(52) U.S. Cl.
USPC ........................... 192/21.5; 192/48.2; 74/330

(58) Field of Classification Search
USPC ........................ 192/21.5, 84.31; 74/330, 331
See application file for complete search history.

(56) References Cited

U.S. PATENT DOCUMENTS 2,870,642 A    1/1959  Randol
5,845,753 A  * 12/1998 Bansbach .................... 192/21.5
(Continued)

FOREIGN PATENT DOCUMENTS

DE    198 15 881    10/1999
FR    1 077 355    11/1954
(Continued)

OTHER PUBLICATIONS

Office Action issued Apr. 9, 2010, in Japanese Patent Application No. 2008-179545, filed Jul. 9, 2008 (with partial English translation).

(Continued)

*Primary Examiner* — David D Le
*Assistant Examiner* — Jacob S Scott
(74) *Attorney, Agent, or Firm* — Oblon, Spivak, McClelland, Maier & Neustadt, L.L.P.

(57) ABSTRACT

A twin-clutch device that selectively transmits torque from a driving wheel to a first driven wheel and/or a second driven wheel is provided. The first and second driven wheels are arranged respectively on both sides of the driving wheel, a functional fluid that decreases its flowability as an applied stimulus is increased and that increases its flowability as the applied stimulus is reduced fills gaps between the driving wheel and the first and second driven wheels, the driving wheel includes a stimulus generating member electrically controlled to generate a stimulus, and flowability of the functional fluid between the driving wheel and one of the first and second driven wheels is decreased with an increase in stimulus applied to the functional fluid by the stimulus generating member to couple the driving wheel to the one of the first and second driven wheels, thus allowing torque transmission therebetween.

11 Claims, 6 Drawing Sheets

(56) References Cited

U.S. PATENT DOCUMENTS

| | | | | |
|---|---|---|---|---|
| 6,183,386 | B1 * | 2/2001 | Duggan | 192/21.5 |
| 7,588,131 | B2 * | 9/2009 | Steinwender | 192/21.5 |
| 8,016,092 | B2 * | 9/2011 | McDaniel | 192/21.5 |
| 2010/0108453 | A1 | 5/2010 | Ogawa et al. | |

FOREIGN PATENT DOCUMENTS

| FR | 1 281 691 | 1/1962 |
|---|---|---|
| GB | 767 000 | 1/1957 |
| JP | 39 014867 | 7/1964 |
| JP | 62 278326 | 12/1987 |
| JP | 1 93629 | 4/1989 |
| JP | 02 097588 | 8/1990 |
| JP | 4 131526 | 5/1992 |
| JP | 07 259905 | 10/1995 |
| JP | 07 293594 | 11/1995 |
| JP | 08 512450 | 12/1996 |

OTHER PUBLICATIONS

International Search Report issued Nov. 13, 2009 in PCT/IB09/006187 filed Jul. 8, 2009.

* cited by examiner

TWIN-CLUTCH DEVICE

BACKGROUND OF THE INVENTION

1. Field of the Invention

The invention relates to a clutch device that is engaged so as to selectively transmit torque from one rotating member to other two rotating members and, more particularly, to a twin-clutch device that sets an engaged state by using a functional fluid, such as a magnetic fluid, of which flowability decreases with an increase in stimulus applied from an outside.

2. Description of the Related Art

A clutch device selectively couples relatively rotatable two rotating members so that torque can be transmitted between the two rotating members. A friction clutch is generally used in a drive train of a vehicle. The friction clutch is operated by force on a pedal or hydraulic pressure. In contrast, an electromagnetic clutch is known and is able to electrically control switching operation between engagement and release. An example of the electromagnetic clutch is described in Japanese Patent Application Publication No. 4-131526 (JP-A-4-131526).

The clutch described in JP-A-4-131526 uses a magnetic fluid. A plurality of armature plates are secured to a rotary shaft of the clutch, and the armature plates are accommodated in a fluidtight state inside a closed chamber formed in a pulley. The closed chamber is filled with the magnetic fluid. An electromagnetic coil is provided for the clutch and applies magnetism to the magnetic fluid for magnetization. Thus, by energizing the magnetic coil, a shearing coefficient (shearing force) of the magnetic fluid is increased to transmit torque between the rotary shaft and the pulley.

With the clutch configured as described in JP-A-4-131526, the clutch may be engaged by energizing the electromagnetic coil, and the clutch may be released by deenergizing the electromagnetic coil. Thus, it is possible to electrically perform so-called on/off control of the clutch. However, transmission and interruption of torque as in the above manner is applicable only to between a single rotary shaft and a single pulley. Therefore, as in the case of a clutch used in a so-called twin-clutch transmission, when torque is transmitted or interrupted between a single drive shaft and two intermediate shafts, two sets of mechanisms, such as the closed chamber, electromagnetic fluid and electromagnetic coil, which are described in JP-A-4-131526, need to be provided. For this reason, the size of the configuration increases as a whole. This may deteriorate mountability or increase cost.

SUMMARY OF THE INVENTION

The invention provides a twin-clutch device that has a simple configuration and that is able to improve controllability.

A first aspect of the invention relates to a twin-clutch device. The twin-clutch selectively transmits torque from a first rotating member to any one of or both of a second rotating member and a third rotating member. In the twin-clutch device, the second rotating member and the third rotating member are arranged respectively on both sides of the first rotating member, a functional fluid fills gaps between the first rotating member and the second rotating member and third rotating member, wherein the functional fluid decreases its flowability as a stimulus applied to the functional fluid is increased, and increases its flowability as the applied stimulus is reduced, a stimulus generating member is provided for the first rotating member and is electrically controlled to generate the stimulus, and flowability of the functional fluid between the first rotating member and one of the second rotating member and the third rotating member is decreased with an increase in stimulus applied to the functional fluid by the stimulus generating member to couple the first rotating member to the one of the second rotating member and the third rotating member via the functional fluid of which the flowability is decreased, whereby allowing torque to be transmitted between the first rotating member and the one of the second rotating member and the third rotating member.

With the above twin-clutch device, as the stimulus generating member is electrically controlled to apply a stimulus to the functional fluid, flowability of the functional fluid decreases. For example, the viscosity, shearing force or shearing coefficient of the functional fluid increases. Thus, by applying a stimulus as described above to any one of the functional fluid between the first rotating member and the second rotating member or the functional fluid between the first rotating member and the third rotating member, the first rotating member is coupled to the second rotating member so as to allow torque to be transmitted therebetween or the first rotating member is coupled to the third rotating member so as to allow torque to be transmitted therebetween. Therefore, it is possible to selectively couple two rotating members to a single rotating member, and, in addition, it is possible to electrically couple and release the rotating members. Thus, it is possible to obtain a twin-clutch device with a simple configuration and favorable controllability.

The functional fluid may include a magnetic fluid that increases its shearing coefficient or shearing force as the magnetic fluid is magnetized, and the stimulus generating member may include an electromagnet.

With the above twin-clutch device, by energizing the electromagnet, deenergizing the electromagnet or appropriately controlling the direction of electric current supplied to the electromagnet, a magnetic path is formed to pass across the magnetic fluid between the first rotating member and the second rotating member or the magnetic fluid between the first rotating member and the third rotating member. This increases the shearing coefficient of the magnetic fluid in which the magnetic path is formed. As a result, the first rotating member is coupled to the second rotating member or the third rotating member so as to substantially allow torque to be transmitted. The above coupled state may be set between the first rotating member and the second rotating member and/or between the first rotating member and the third rotating member on the basis of a state of energization, such as supply of electric current or interruption of electric current. Thus, two clutch functions may be controlled by controlling electric current supplied to a single electromagnet. As a result, it is possible to improve mountability with a simplified configuration as a whole, and it is possible to achieve low cost. In addition, because so-called engagement/release control may be performed electrically, controllability is favorable. Moreover, there is no mechanical friction, so heating may be suppressed and heat may be transferred by flow of the fluid. Thus, cooling performance is favorable and, by extension, durability may be improved.

A permanent magnet may be provided for one of the second rotating member and the third rotating member at a portion facing the electromagnet, and a magnetic material may be provided for the other one of the second rotating member and the third rotating member at a portion facing the electromagnet.

With the above twin-clutch device, by deenergizing the electromagnet, a magnetic field of the permanent magnet is applied to the magnetic fluid, so the rotating member equipped with the permanent magnet may be coupled to the first rotating member so as to allow torque to be transmitted. In addition, when a magnetic field of a polarity opposite to the magnetic field of the permanent magnet, the magnetic fluid between the rotating member equipped with the permanent magnet and the first rotating member is not magnetized, whereas, to the contrary, the magnetic fluid between the rotating member not equipped with the permanent magnet and the first rotating member is magnetized to couple these rotating members so as to allow torque to be transmitted. Thus, it is only necessary to energize the electromagnet only when torque is transmitted through any one of the pairs of rotating members, so it is possible to reduce energy consumption.

The electromagnet may be constructed so that a coil is arranged in a yoke made of a non-magnetic material, the second rotating member and the third rotating member may respectively include permanent magnets that face the electromagnet and that have the same direction of a magnetic pole, and a current control unit that reverses a direction of electric current supplied to the coil may be provided for the twin-clutch device.

With the above twin-clutch device, in a state where the electromagnet is not energized, no magnetic path is formed by the permanent magnets between the first rotating member and the second rotating member and third rotating member because the yoke of the electromagnet is made of a non-magnetic material. Thus, the shearing coefficient of the magnetic fluid does not increase, so torque is not allowed to be transmitted between any one of the pairs of the rotating members. That is, the clutch is maintained in a released state. In contrast, when electric current in a predetermined direction is supplied to the coil, a magnetic path is formed between the coil and the permanent magnet that applies a magnetic flux having the same polarity or direction as the magnetic flux generated by the coil. Then, the rotating member equipped with that permanent magnet is coupled to the first rotating member via the magnetic fluid, of which the shearing coefficient is increased, so as to allow torque to be transmitted. In addition, when the direction of electric current supplied to the coil is reversed, the rotating member equipped with the other permanent magnet is coupled to the first rotating member so as to allow torque to be transmitted. That is, it is possible to set three states, that is, a neutral state where torque is not transmitted, a state where the first rotating member is coupled to the second rotating member, and a state where the first rotating member is coupled to the third rotating member, by controlling electric current supplied to the single electromagnet.

The one of the second rotating member and the third rotating member may be coupled to a low-speed side transmission mechanism having a relatively large speed ratio, and the other one of the second rotating member and the third rotating member may be coupled to a high-speed side transmission mechanism having a relatively small speed ratio.

With the above twin-clutch device, in a state where the electromagnet is not energized, the first rotating member is coupled to the high-speed side transmission mechanism having a relatively small speed ratio. Thus, if the twin-clutch device is mounted on a vehicle and then the first rotating member is used as a drive side member to which torque is transmitted from a power source, even when the low-speed side transmission mechanism is coupled to drive wheels while the vehicle is stopped and the power source is idling, the low-speed side transmission mechanism is not coupled to the first rotating member, which is the drive side member. That is, the electromagnet may be left off, and it is possible to suppress consumption of electric energy. In addition, in a high-speed running mode, the high-speed side transmission mechanism is coupled to the drive wheels, and the high-speed side transmission mechanism is also coupled to the first rotating member, which is the drive side member. Thus, it is not necessary to energize the electromagnet during high-speed running mode that is frequently used, so it is possible to suppress consumption of electric energy.

A current control unit may be provided for the twin-clutch device, and may reverse a direction of electric current supplied to the electromagnet.

With the above twin-clutch device, the direction (or polarity) of a magnetic flux generated by the electromagnet may be reversed, it is possible to appropriately control coupling and decoupling of the rotating members, and it is possible to couple those three rotating members so as to allow torque to be transmitted. Thus, when the twin-clutch device is mounted on the vehicle together with a transmission, it is possible to control the twin-clutch device so as to generate braking force during deceleration.

When torque transmission is initiated from a state where the electromagnet is not energized and no torque is transmitted between the rotating members, the electromagnet may be temporarily energized so as to generate a magnetic flux in a direction to demagnetize a residual magnetism in the magnetic fluid due to the permanent magnet.

With the above twin-clutch device, it is possible to eliminate a residual magnetism due to the permanent magnet when the vehicle is started, so it is possible to prevent, for example, a situation that a transmission torque capacity between any two of the rotating members decreases after the vehicle starts.

The magnetic fluid may be any one of a magnetic powder and a magnetic fluid that mixes magnetic powder particles with oil.

With the above twin-clutch device, when the magnetic power is used, it is possible to reduce cost.

A second aspect of the invention relates to a power transmission mechanism. The power transmission mechanism includes: the twin-clutch device according to the first aspect of the invention; a first counter shaft that is arranged to be engageable with the second rotating member; a second counter shaft that is arranged to be engageable with the third rotating member; and an output shaft that is arranged to be engageable with the first counter shaft or the second counter shaft.

A third aspect of the invention relates to a method of controlling a twin-clutch device. The twin-clutch device, to which the method is applied, includes a first rotating member, a second rotating member to which torque is transmitted from the first rotating member, a third rotating member to which torque is transmitted from the first rotating member and which is provided on an opposite side to the second rotating member with respect to the first rotating member, a functional fluid that fills gaps between the first rotating member and the second rotating member and third rotating member and that decreases its flowability as a stimulus applied to the functional fluid is increased and that increases its flowability as the applied stimulus is reduced, and a stimulus generating member that is provided for the first rotating member and that is electrically controlled to generate the stimulus. The method of controlling the twin-clutch device includes: applying a stimulus to the functional fluid by the stimulus generating member so as to decrease flowability of the functional fluid between the first rotating member and one of the second rotating member and the third rotating member; and coupling the first rotating member to the one of the second rotating member and the third rotating member via the functional fluid of which the flowability is decreased, whereby allowing torque to be transmitted between the first rotating member and the one of the second rotating member and the third rotating member.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 12:
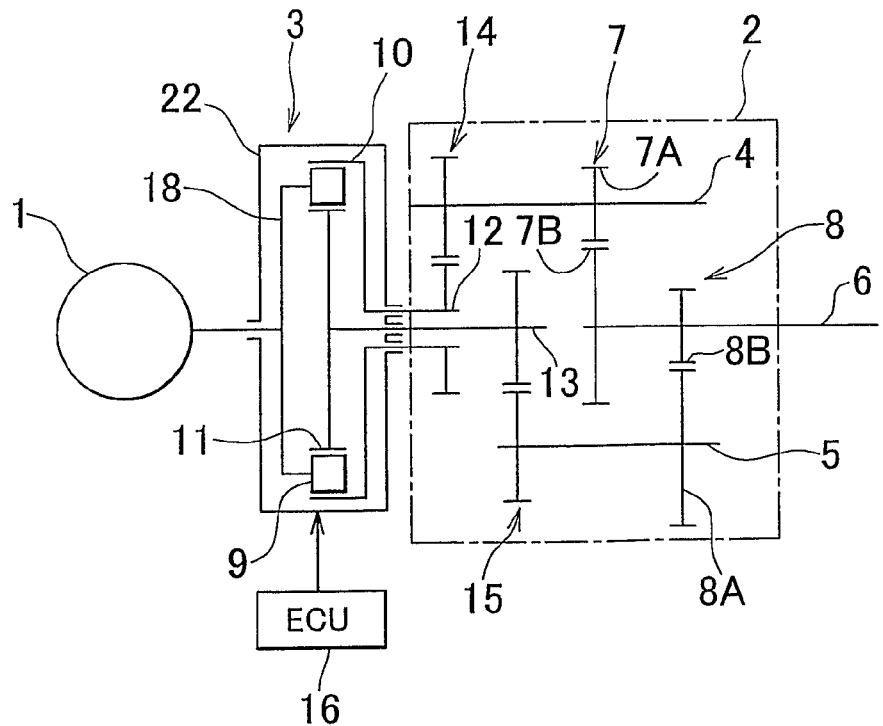
FIG. 12 is a view that schematically shows a drive line in a vehicle equipped with the clutch device according to the embodiment of the invention.

An embodiment of the invention will be specifically described. A clutch device according to the embodiment of the invention may be used as an engagement element that transmits or interrupts torque in a drive line of a vehicle to change speed ratios or shift ranges or that switches between forward and reverse running modes. FIG. 12 schematically shows an example of the clutch device. The clutch device 3 according to the embodiment of the invention is arranged between a power source 1 and a transmission 2. The power source 1 is, in short, a power unit that outputs power for propelling the vehicle. An internal combustion engine, such as a gasoline engine, an electric motor, a hybrid power unit of a combination of the internal combustion engine and the electric motor, or the like, may be used.

In addition, the transmission 2 may be, for example, constructed by a mechanism formed of a plurality of constantly meshed gear pairs and a plurality of sets of planetary gear mechanisms, a mechanism formed of a combination of planetary rollers, or a continuously variable mechanism that is able to continuously change speed ratios. FIG. 12 shows an example of a twin-clutch transmission, in which a first counter shaft 4, a second counter shaft 5 and an output shaft 6 are arranged parallel to one another. Note that FIG. 12 shows a configuration that sets forward two-speed gears, and a mechanism for setting another gear, such as a reverse gear, is not shown.

The output shaft 6 is arranged between the counter shafts 4 and 5. The first counter shaft 4 is coupled to the output shaft 6 via a first-speed gear pair 7. The second counter shaft 5 is coupled to the output shaft 6 via a second-speed gear pair 8. More specifically, a first-speed drive gear 7A is secured to the first counter shaft 4, and a first-speed driven gear 7B is secured to the output shaft 6. The first-speed driven gear 7B is in mesh with the first-speed drive gear 7A. The diameter of the first-speed drive gear 7A is smaller than the diameter of the first-speed driven gear 7B. As a result, the first-speed gear pair 7 has a speed ratio larger than "1", and serves as a speed reduction gear. The first-speed gear pair 7 corresponds to a low-speed side transmission mechanism according to the aspects of the invention.

In addition, a second-speed drive gear 8A is secured to the second counter shaft 5, and a second-speed driven gear 8B is secured to the output shaft 6. The second-speed driven gear 8B is in mesh with the second-speed drive gear 8A. The diameter of the second-speed drive gear 8A is larger than the diameter of the second-speed driven gear 8B. As a result, the second-speed gear pair 8 has a speed ratio smaller than "1", and serves as a speed increasing gear. The second-speed gear pair 8 corresponds to a high-speed side transmission mechanism according to the aspects of the invention.

The clutch device 3 according to the embodiment of the invention selectively transmits torque output from the power source 1 to the first counter shaft 4 or to the second counter shaft 5. That is, a first driven wheel 10 and a second driven wheel 11 are provided on both sides of a driving wheel 9, which serves as a first rotating member. A first intermediate shaft 12, which is a hollow shaft, is integrated with the first driven wheel 10, and a second intermediate shaft 13 is arranged inside the first intermediate shaft 12 so that the second intermediate shaft 13 is coaxial with the first intermediate shaft 12. Then, the second intermediate shaft 13 is integrated with the second driven wheel 11. The first intermediate shaft 12 is coupled to the first counter shaft 4 via a first counter gear pair 14 to allow torque to be transmitted therebetween. In addition, the second intermediate shaft 13 is coupled to the second counter shaft 5 via a second counter gear pair 15 to allow torque to be transmitted therebetween. Furthermore, an electronic control unit (ECU) 16 is provided in order to control the clutch device 3.

Figure 1:
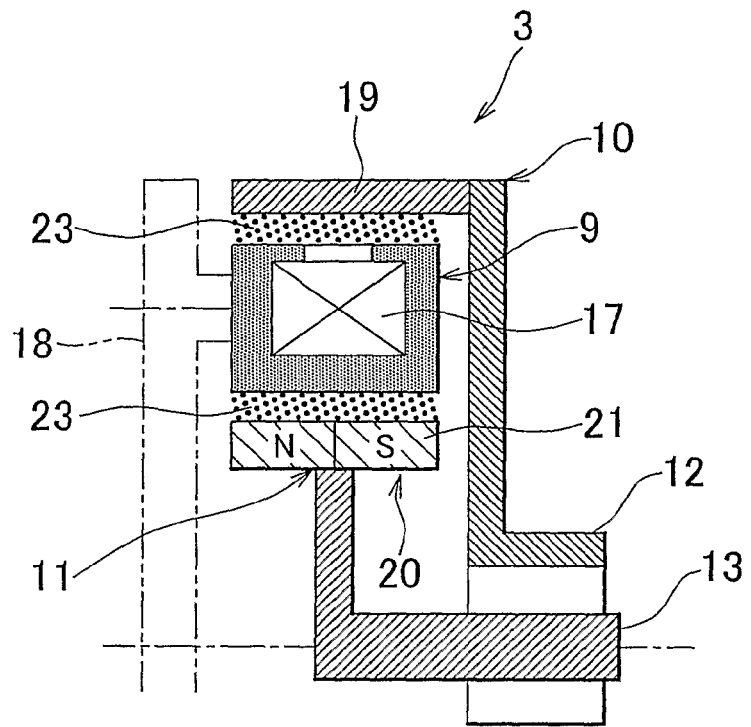
FIG. 1 is a schematic view that shows major components of a clutch device according to an embodiment of the invention.

FIG. 1 shows an example of the specific configuration of the clutch device 3. The example shown herein is an example in which the driving wheel 9 and the driven wheels 10 and 11, which correspond to first to third rotating members according to the aspects of the invention, are arranged concentrically. In the example, the driving wheel 9 has a ring shape, and an electromagnet 17 formed of a yoke and a coil is provided at the ring portion. The electromagnet 17 serves as a stimulus generating member. A drive plate 18 for transmitting torque of the power source 1 is integrated with one side surface of the driving wheel 9 in the axial direction.

In addition, the first driven wheel 10 has a cylindrical portion 19 that radially faces the electromagnet 17 and covers the outer peripheral side of the electromagnet 17 at a predetermined gap. A magnetic member, such as iron, is provided for at least part of the cylindrical portion 19 so as to form a magnetic path with the electromagnet 17. Furthermore, the second driven wheel 11 is arranged on the inner side of the electromagnet 17, and has a cylindrical portion 20 that faces the inner peripheral surface of the electromagnet 17 or driving wheel 9 at a predetermined gap. A permanent magnet 21 is integrated with the cylindrical portion 20. The permanent magnet 21 may be provided all around the cylindrical portion 20 or a plurality of the permanent magnets 21 may be provided at predetermined intervals in the circumferential direction; however, the direction of the magnetic pole is the same all around. For example, as shown in FIG. 1, one side in the axial direction is the north pole, and the other side in the axial direction is the south pole.

The driving wheel 9, the drive plate 18 and the cylindrical portions 19 and 20 are accommodated in a fluidtight state inside a casing 22. The inside of the casing 22 is filled with a magnetic fluid 23, which serves as a functional fluid. Thus, the magnetic fluid 23 fills gaps between the driving wheel 9 and the cylindrical portions 19 and 20 of the driven wheels 10 and 11. Note that the magnetic fluid 23 is a fluid that increases its shearing coefficient when it is magnetized, and that increases its flowability when it is not magnetized. Specifically, the magnetic fluid 23 is a magnetic fluid that is a magnetic powder formed of magnetic powder particles, such as an iron powder, or that mixes magnetic powder particles with oil.

Figure 2:
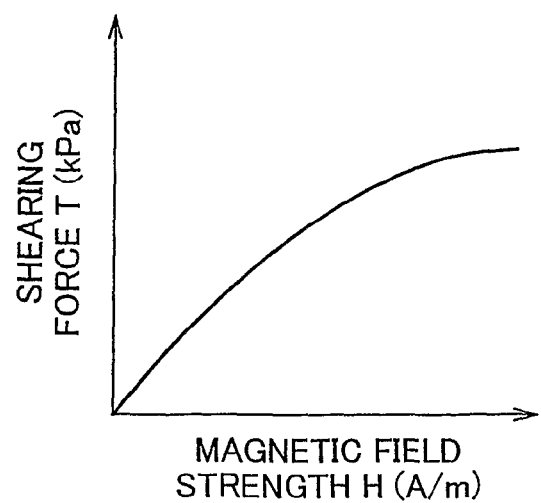
FIG. 2 is a graph that shows the characteristics of a magnetic fluid.
Figure 3:
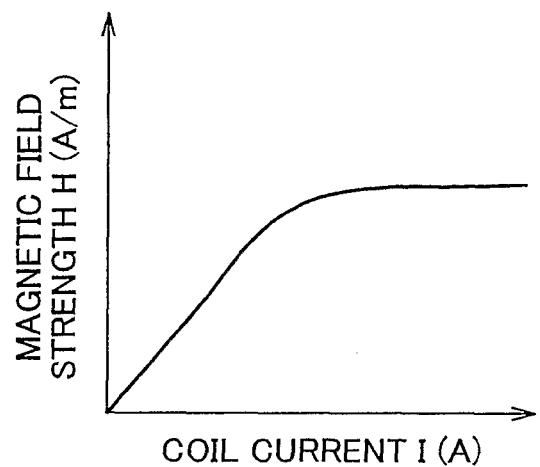
FIG. 3 is a graph that shows the characteristics of an electromagnetic coil.
Figure 4:
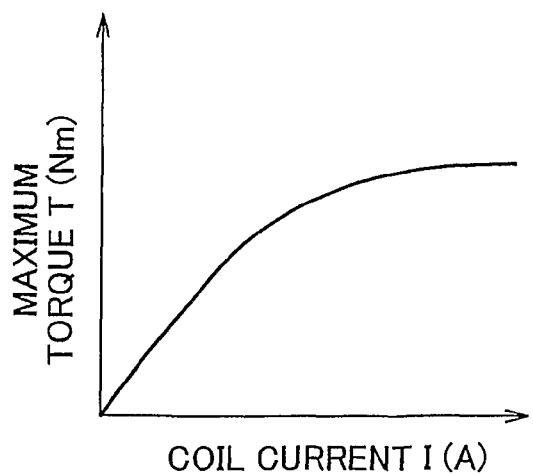
FIG. 4 is a graph that shows the relationship between a transmission torque capacity (engagement torque) and a coil current.

Here, the characteristics of the magnetic fluid 23 and electromagnet 17 and the transmission torque capacity (engagement torque) obtained by those magnetic fluid 23 and electromagnet 17 will be described. The relationship between a shearing force of a magnetic fluid, which serves as the magnetic fluid 23, in which magnetic powder particles, such as an iron powder, are mixed with oil and a strength of a magnetic field is shown in FIG. 2. That is, the shearing force t increases with an increase in strength of the magnetic field. In addition, as shown in FIG. 3, the strength H of the magnetic field generated by the electromagnet 17 increases with an increase in electric current supplied to the coil, and the gradient of increase in strength H of the magnetic field is gentle at a predetermined electric current or above and ultimately becomes substantially constant. That is, the strength H of the magnetic field becomes saturated. The clutch device 3 according to the embodiment of the invention applies a magnetic field to the above magnetic fluid to transmit torque using a shearing force that increases as the result. Thus, as shown in FIG. 4, the transmission torque capacity (engagement torque) increases with an increase in coil current, and, after the electric current value increases to a predetermined value, the gradient of increase in torque becomes gentle.

Figure 5:
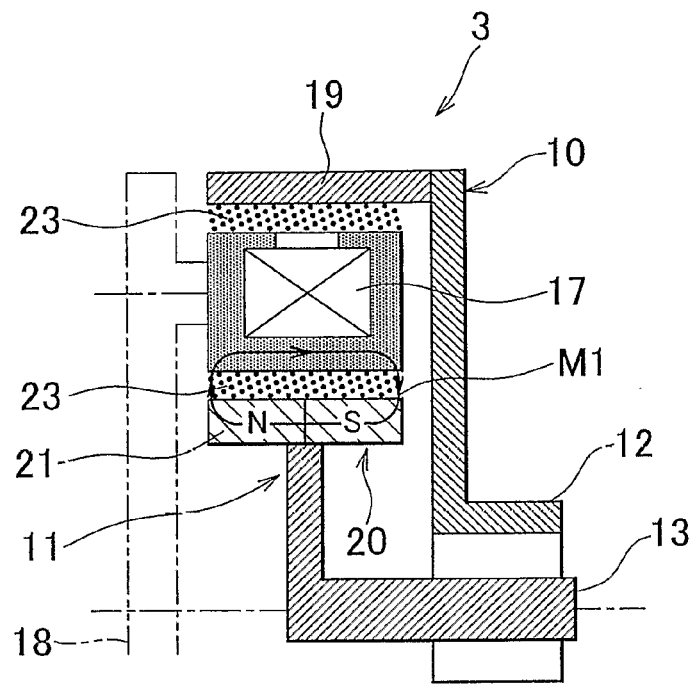
FIG. 5 is a schematic view that illustrates a state where the clutch device shown in FIG. 1 is operated.

Next, the operation of the clutch device 3 will be described. FIG. 5 shows a magnetic path in an off state where the electromagnet 17 is not energized. Because the yoke of the electromagnet 17 is made of a magnetic material, a magnetic flux of the permanent magnet 21 passes across the magnetic fluid 23 to the electromagnet 17. Thus, a magnetic path M1 is formed as indicated by the line with an arrow in FIG. 5. As a result, the magnetic fluid 23 between the driving wheel 9 and the second driven wheel 11 is magnetized to increase its shearing coefficient, so the driving wheel 9 is coupled to the second driven wheel 11 via the magnetized and solidified magnetic fluid 23 by magnetic force to allow torque to be transmitted therebetween. That is, the driving wheel 9 is engaged with the second driven wheel 11. In this case, substantially no magnetic field acts on the magnetic fluid 23 between the driving wheel 9 and the cylindrical portion 19 of the first driven wheel 10, so flowability of that magnetic fluid 23 is high, and the driving wheel 9 and the first driven wheel 10 are maintained in a so-called non-engaged state where no torque is transmitted.

In this way, the second driven wheel 11 engaged with the driving wheel 9 is coupled to the second-speed gear pair 8, which is the high-speed side transmission mechanism, via the second intermediate shaft 13, so a high-speed gear side speed ratio is set as a speed ratio.

Figure 6:
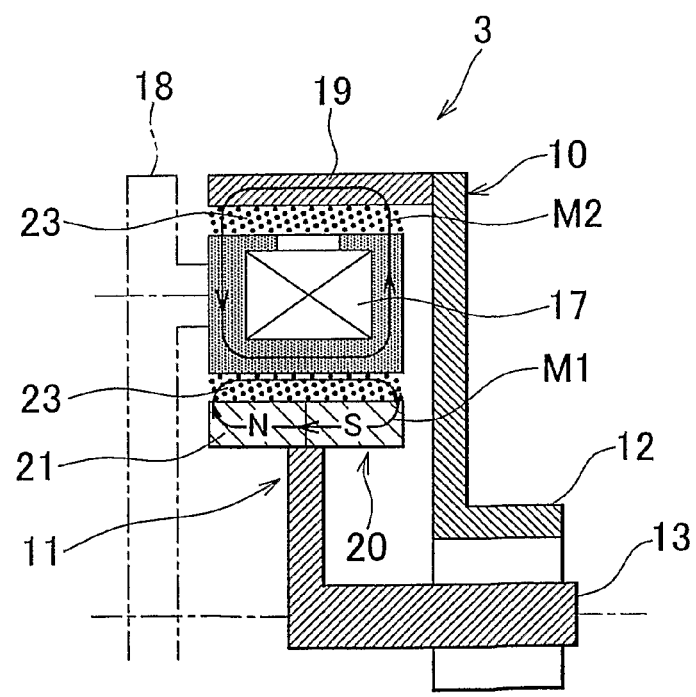
FIG. 6 is a schematic view that illustrates another state where the clutch device shown in FIG. 1 is operated.

On the other hand, when the electromagnet 17 is energized so that a portion of the electromagnet 17 facing the permanent magnet 21 becomes the same pole as that of the permanent magnet 21, the driving wheel 9 is coupled to the first driven wheel 10 to allow torque to be transmitted therebetween, and the driving wheel 9 is released from the second driven wheel 11. This state is shown in FIG. 6. That is, because the magnetic member is provided at the cylindrical portion 19 of the first driven wheel 10, a magnetic flux generated by the electromagnet 17 passes across the magnetic fluid 23 to the cylindrical portion 19 of the first driven wheel 10. Thus, a magnetic path M2 is formed as indicated by the line with an arrow in FIG. 6. As a result, the magnetic fluid 23 between the driving wheel 9 and the first driven wheel 10 is magnetized to increase its shearing coefficient, so the driving wheel 9 is coupled to the first driven wheel 10 via the magnetized and solidified magnetic fluid 23 by magnetic force to allow torque to be transmitted therebetween. That is, the driving wheel 9 is engaged with the first driven wheel 10.

In this case, the magnetic force (or magnetic flux) generated by the electromagnet 17 acts to cancel the magnetic force (or magnetic flux) of the permanent magnet 21 between the driving wheel 9 and the second driven wheel 11, so no magnetic path is formed in a direction that passes across the magnetic fluid 23 between these driving wheel 9 and second driven wheel 11 (that is, vertical direction). As a result, the shearing coefficient (or shearing force) of the magnetic fluid 23 between the driving wheel 9 and the second driven wheel 11 is substantially zero, and the clutch device 3 is placed in a state where the driving wheel 9 is released from the second driven wheel 11, that is, in a non-engaged state.

Thus, the first driven wheel 10 that is engaged with the driving wheel 9 by energizing the electromagnet 17 as described above is coupled to the first-speed gear pair 7, which is the low-speed side transmission mechanism, via the first intermediate shaft 12, so a low-speed gear side speed ratio is set as a speed ratio.

Figure 7:
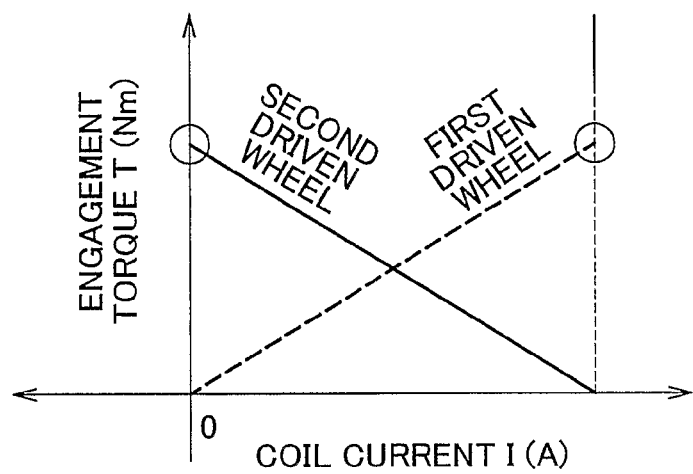
FIG. 7 is a graph that shows the relationship between a coil current and an engagement torque of the clutch device shown in FIG. 1.

Note that the magnetic force generated by the electromagnet 17 is directly proportional to a supplied electric current, so an electric current for releasing engagement between the driving wheel 9 and the second driven wheel 11 is set to such an electric current that generates a magnetic force corresponding to the magnetic force of the permanent magnet 21. Here, FIG. 7 shows the relationship between a supplied electric current value and an engagement torque by which the driven wheel 10 or 11 is engaged. That is, in a state where the electric current value supplied to the electromagnet 17 is zero, the engagement torque by which the second driven wheel 11 is engaged with the driving wheel 9 is maximal, and the engagement torque by which the first driven wheel 10 is engaged with the driving wheel 9 is zero. As the electric current value is increased from that state, a magnetic force in a magnetic path that vertically passes across the magnetic fluid 23 between the driving wheel 9 and the first driven wheel 10 increases with an increase in electric current value. Thus, the engagement torque increases. In contrast, the magnetic force of the permanent magnet 21 is canceled by the magnetic force generated by the electromagnet 17, so the engagement torque by which the second driven wheel 11 is engaged with the driving wheel 9 decreases with an increase in electric current value. Then, as the electric current value increases to an extent such that the engagement torque by which the second driven wheel 11 is engaged with the driving wheel 9 is zero, the engagement torque between the first driven wheel 10 and the driving wheel 9 is maximal. In a state where an electric current having half the above electric current value is supplied to the electromagnet 17, the engagement torque between the driving wheel 9 and the driven wheel 10 is substantially equal to the engagement torque between the driving wheel 9 and the driven wheel 11. Thus, the clutch device 3 is placed in a so-called low double lock state.

Thus, with the clutch device 3 according to the embodiment of the invention, it is possible to selectively couple the two driven wheels 10 and 11 to the single driving wheel 9 equipped with the electromagnet 17. Therefore, even when there are two target members to which torque is to be transmitted, it is enough to include the single electromagnet 17 and a single control device for the electromagnet 17. As a result, it is possible to improve mountability with a simplified configuration of the device as a whole, and it is possible to achieve low cost. In addition, so-called engagement/release control may be controlled by supplying or interrupting electric current. Thus, the control is easy, and it is possible to implement high-response control, so the twin-clutch device may have favorable controllability. Particularly, as shown in FIG. 7 as described above, the respective engagement torques continuously increases and decreases with an increase in electric current value. Thus, in the case of a so-called clutch-to-clutch shifting that is carried out by switching two clutches, the shifting may be carried out without interrupting torque, and the shift control is also easy. Furthermore, in the clutch device 3 according to the embodiment of the invention, torque is transmitted using the shearing force of the magnetic fluid 23. Thus, even when heat is generated in accordance with torque transmission, the heat is transferred to a radiating portion by transfer of fluid, so it is possible to obtain a clutch device that has high cooling characteristic or radiation characteristic and, by extension, has high durability.

In addition, with the configuration shown in FIG. 1 and FIG. 12, it is possible to set a high-speed gear by deenergizing the electromagnet 17 to place the electromagnet 17 in a so-called off state. Thus, in a state where the vehicle is stopped and the power source 1 is idling, even when the first-speed gear pair 7, which is the low-speed side transmission mechanism, is in mesh in the transmission 2, the meshed first-speed gear pair 7 is decoupled from the power source. Thus, large driving torque does not occur. That is, in a state where the vehicle is stopped and the power source 1 is idling, it is not necessary to energize the electromagnet 17, so it is possible to suppress consumption of electric energy. In addition, when the electromagnet 17 is placed in the above so-called off state, the high-speed side transmission mechanism is coupled to the power source and, therefore, the high-speed gear is set. Thus, it is not necessary to energize the electromagnet 17 at the high-speed gear, which is frequently used during running. In terms of this point as well, consumption of electric energy is suppressed, so it is possible to improve fuel economy.

Incidentally, a circuit that supplies electric current to the electromagnet 17 includes a change-over switch that reverses the direction in which electric current flows or a switching mechanism corresponding to the change-over switch, and then the electronic control unit 16 causes the change-over switch or the switching mechanism to perform switching operation. The above mechanism corresponds to a current control unit according to the aspects of the invention. As the current control unit reverses the direction of electric current supplied to the electromagnet 17 with respect to the direction of the above described example, it is possible to engage both the driven wheels 10 and 11 with the driving wheel 9 at a time.

That is, as the electromagnet 17 is energized so that portions of the electromagnet 17, which respectively face the magnetic poles of the permanent magnet 21, have magnetic poles opposite to the magnetic poles of the permanent magnet 21, a magnetic path that vertically passes across the magnetic fluid 23 between the permanent magnet 21 and the electromagnet 17 is formed therebetween, and the magnetic force is increased. As a result, the driving wheel 9 is more tightly engaged with the second driven wheel 11, and the engagement torque between the driving wheel 9 and the driven wheel 11 increases as compared with the engagement torque in the above described example. In addition, because a magnetic path that vertically passes across the magnetic fluid 23 between the driving wheel 9 and the first driven wheel 10 is formed between the driving wheel 9 and the first driven wheel 10, the driving wheel 9 is engaged with the first driven wheel 10 like the above described example to allow torque to be transmitted between the driving wheel 9 and the first driven wheel 10. In this manner, the driving wheel 9 is engaged with both the driven wheels 10 and 11.

In the above so-called simultaneous engagement state, the power source 1 and drive wheels (not shown) are coupled via both the low-speed side transmission mechanism and the high-speed side transmission mechanism, so it becomes a so-called double lock state and then rotation of the drive wheels is restricted. In this case, a member that couples the driving wheel 9 with both the driven wheels 10 and 11 is the magnetic fluid 23 of which shearing force is large, and the magnetic fluid 23 has flowability to some extent. Therefore, the power source 1 and the drive wheels are able to continuously rotate without any mechanical damage. However, torque that deforms or flows the magnetic fluid 23 acts as braking force, so it is desirable that the simultaneous engagement state is set during deceleration.

That is, the direction of electric current supplied to the electromagnet 17 is controlled as described above on the basis of a detected signal from a detecting device (not shown) that detects an intention of braking, such as a brake switch (not shown), to set a simultaneous engagement state. By so doing, it is possible to have a braking state similar to a power source braking state, such as an engine brake state, so a load on a braking device provided for each wheel is reduced. Thus, it is possible to reduce the size of the braking device or such a braking device may be replaced with the clutch device 3. As a result, it is possible to reduce the weight of the vehicle with the reduced number of components, and it is possible to achieve low cost.

Note that when the electromagnet 17 is kept in an off state, the magnetic path M1 that vertically passes across the magnetic fluid 23 between the driving wheel 9 and the second driven wheel 11 is constantly formed by the magnetic field of the permanent magnet 21. As the above state continues for a long period of time, the shearing coefficient (shearing force) of the magnetic fluid 23 remains large to some extent because of residual magnetism. Therefore, even when the electromagnet 17 is energized so as to release the second driven wheel 11 from the driving wheel 9, there is a possibility that the engagement torque remains and a so-called drag may occur. In order to eliminate the above inconvenience, when the vehicle is started after the vehicle is kept stopped for a long period or for a long time, it is desirable to perform control for eliminating residual magnetism.

An example of the control will be described. When a start instruction signal, such as a starter switch and an ignition switch, of the power source 1 is detected, the electromagnet 17 is energized so as to generate a magnetic field that eliminates the residual magnetism of the magnetic fluid 23 due to the permanent magnet 21. A period of time for the energization and the electric current value may be set in advance on the basis of the magnetic force of the permanent magnet 21, or the like, and a period of time for energization may be, for example, about several tens of milliseconds or several hundreds of milliseconds. After the residual magnetism is eliminated in this manner, the power source 1 is started, and then the vehicle runs as usual. By so doing, an engagement torque as assumed is generated to make it possible to obtain a desired shift characteristic or power characteristic.

Figure 8:
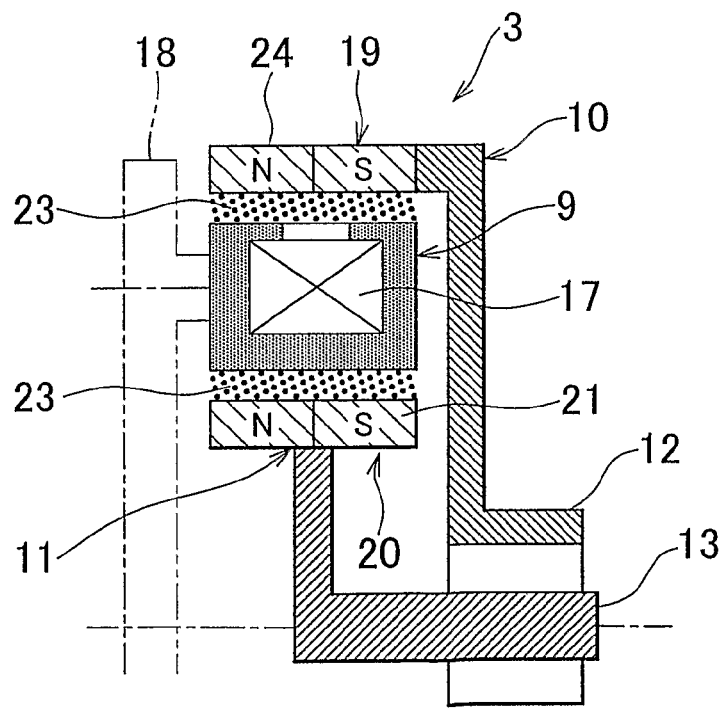
FIG. 8 is a schematic view that shows major components of another clutch device according to an embodiment of the invention.

Next, another embodiment of the invention will be described. In the clutch device according to the embodiment of the invention, each of the first and second driven wheels 10 and 11 may have a permanent magnet, and then the yoke of the electromagnet may be made of a non-magnetic material, accordingly. FIG. 8 shows an example of the above embodiment. The example shown here is an example in which, in the above described configuration shown in FIG. 1, a permanent magnet 24 similar to the permanent magnet 21 provided in the cylindrical portion 20 of the second driven wheel 11 is provided at the cylindrical portion 19 of the first driven wheel 10. That is, portions of the permanent magnets 21 and 24, radially facing each other, have the same magnetic poles, and in the example shown in FIG. 8, one end in the axial direction is the north pole, and the other end in the axial direction is the south pole. The other configuration is similar to that shown in FIG. 1, so like reference numerals in FIG. 8 denote like components to those in FIG. 1 and the description thereof is omitted.

In the configuration shown in FIG. 8, because the yoke of the electromagnet 17 is made of a non-magnetic material, in a state where the electromagnet 17 is not generating a magnetic flux, no magnetic path is formed between each of the permanent magnets 21 and 24 and the electromagnet 17. That is, in a so-called off state where the electromagnet 17 is not energized, no magnetic path that vertically passes across the magnetic field 23 between the driving wheel 9 and each of the driven wheels 10 and 11 is formed, so the shearing coefficient of the magnetic fluid 23 is small or the shearing force is substantially zero. Thus, the driving wheel 9 is not coupled to the driven wheel 10 or 11 to allow torque to be transmitted therebetween, so the clutch is in a released state. In this state, both the first-speed gear pair 7 and the second-speed gear pair 8 are decoupled from the power source 1, so it enters a so-called neutral state.

Figure 9:
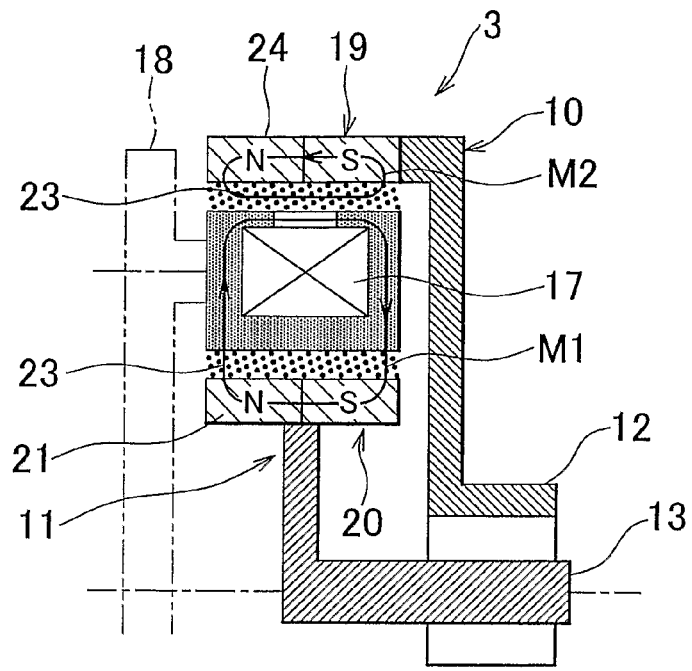
FIG. 9 is a schematic view that illustrates a state where the clutch device shown in FIG. 8 is operated.

In contrast, as electric current is supplied to the electromagnet 17, a magnetic path that vertically passes across the magnetic fluid 23 is formed by a magnetic flux generated by the electromagnet 17 and a magnetic flux of any one of the permanent magnets 21 and 24. FIG. 9 shows a magnetic path when electric current is supplied to the electromagnet 17 so that a magnetic flux is generated in a clockwise direction around the coil. In this case, the direction of the magnetic flux generated by the electromagnet 17 coincides with the direction of the magnetic flux of the permanent magnet 21 provided in the second driven wheel 11. Thus, a magnetic path M1 that vertically passes across the magnetic fluid 23 between the driving wheel 9 and the second driven wheel 11 is formed between the driving wheel 9 and the second driven wheel 11. As a result, the magnetic fluid 23 between the driving wheel 9 and the second driven wheel 11 is magnetized to increase its shearing coefficient, so the driving wheel 9 is coupled to the second driven wheel 11 via the magnetized and solidified magnetic fluid 23 by magnetic force to allow torque to be transmitted therebetween. That is, the driving wheel 9 is engaged with the second driven wheel 11.

On the other hand, at the cylindrical portion 19 side of the first driven wheel 10, the magnetic pole of the permanent magnet 24 faces the magnetic pole generated by energization in the electromagnet 17, and then the respective magnetic fluxes cancel each other. Thus, no magnetic path that vertically passes across the magnetic fluid 23 between the driving wheel 9 and the first driven wheel 10 is formed between the driving wheel 9 and the first driven wheel 10. As a result, the shearing coefficient (or shearing force) of the magnetic fluid 23 between the driving wheel 9 and the first driven wheel 10 is substantially zero, and the clutch device 3 is placed in a state where the driving wheel 9 is released from the first driven wheel 10, that is, in a non-engaged state.

Figure 10:
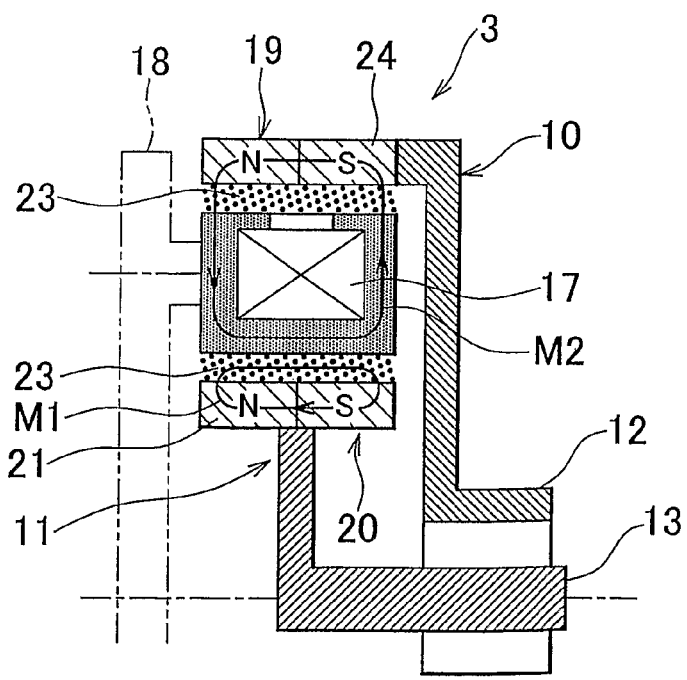
FIG. 10 is a schematic view that illustrates another state where the clutch device shown in FIG. 8 is operated.

Furthermore, when the direction of electric current supplied to the electromagnet 17 is reversed from that in the above case in the configuration shown in FIG. 8, the driving wheel 9 is engaged with the first driven wheel 10 to allow torque to be transmitted therebetween. That is, as shown in FIG. 10, when electric current is supplied to the electromagnet 17 so that a magnetic flux is generated in a counterclockwise direction around the coil, the direction of the magnetic flux generated by the electromagnet 17 coincides with the direction of the magnetic flux of the permanent magnet 24. Thus, a magnetic path M2 that vertically passes across the magnetic fluid 23 between the driving wheel 9 and the first driven wheel 10 is formed between the driving wheel 9 the first driven wheel 10. As a result, the magnetic fluid 23 between the driving wheel 9 and the first driven wheel 10 is magnetized to increase its shearing coefficient, so the driving wheel 9 is coupled to the first driven wheel 10 via the magnetized and solidified magnetic fluid 23 by magnetic force to allow torque to be transmitted therebetween. That is, the driving wheel 9 is engaged with the first driven wheel 10.

In contrast, at the cylindrical portion 20 side of the second driven wheel 11, the magnetic pole of the permanent magnet 21 faces the magnetic pole generated by energization in the electromagnet 17, and then the respective magnetic fluxes cancel each other. Thus, no magnetic force that vertically passes across the magnetic fluid 23 between the driving wheel 9 and the second driven wheel 11 is formed between the driving wheel 9 and the second driven wheel 11. As a result, the shearing coefficient (or shearing force) of the magnetic fluid 23 between the driving wheel 9 and the second driven wheel 11 is substantially zero, and the clutch device 3 is placed in a state where the driving wheel 9 is released from the second driven wheel 11, that is, in a non-engaged state.

Figure 11:
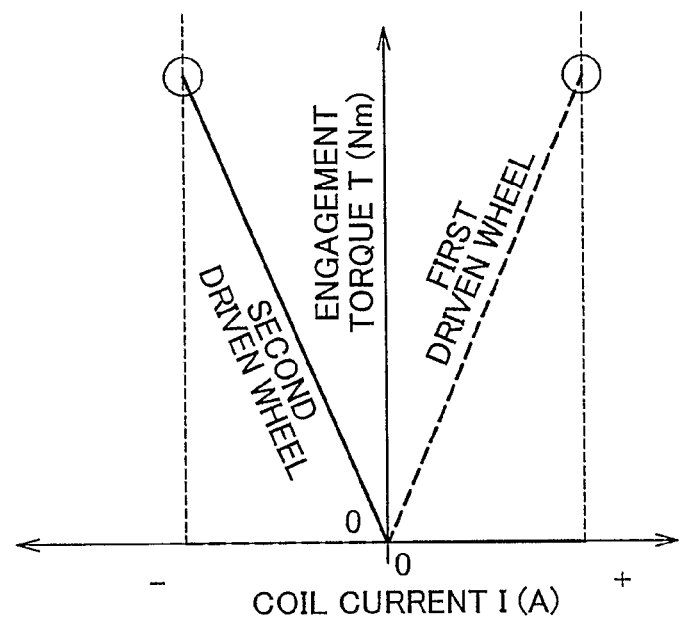
FIG. 11 is a graph that shows the relationship between a coil current and an engagement torque of the clutch device shown in FIG. 8.

Here, FIG. 11 shows the relationship between an electric current value when the clutch device 3 is configured as shown in FIG. 8 and an engagement torque by which the driven wheel 10 or 11 is engaged. That is, in a state where the electric current value of the electromagnet 17 is zero, as described above, no magnetic path that passes across the magnetic fluid 23 is formed in the first driven wheel 10 side or the second driven wheel 11 side. Thus, the respective engagement torques are substantially zero, and the driving wheel 9 is not coupled to the driven wheel 10 or 11, that is, the driving wheel 9 is placed in a non-engaged state. In contrast, when the electromagnet 17 is energized so as to form the magnetic path M1 shown in FIG. 9 (energized in a negative direction in FIG. 11), the magnetic force that passes across the magnetic fluid 23 between the driving wheel 9 and the second driven wheel 11 and its associated engagement torque increase with an increase in electric current value in a negative direction. Note that the engagement torque between the driving wheel 9 and the first driven wheel 10 side is maintained at zero.

To the contrary, when the electromagnet 17 is supplied with electric current in a positive direction in FIG. 11, a magnetic path that vertically passes across the magnetic fluid 23 is formed between the driving wheel 9 and the first driven wheel 10 side. Thus, the magnetic force that passes across the magnetic fluid 23 between the driving wheel 9 and the first driven wheel 10 and its associated engagement torque increase with an increase in electric current value in a positive direction. Note that the engagement torque between the driving wheel 9 and the second driven wheel 11 side is maintained at zero. In this way, when the clutch device 3 is configured as shown in FIG. 8, it is possible to set three power transmission states, that is, the neutral state, the first-speed state and the second-speed state. Then, the size and weight of the configuration may be reduced as a whole, and controllability, cooling performance and durability may be improved. Hence, similar advantageous effects to those of the configuration shown in FIG. 1 may be obtained.

Note that the aspects of the invention are not limited to the above described specific embodiments. The functional fluid that mediates transmission of torque between the rotating members may be a fluid that changes its flowability by an applied stimulus, such as heat, light or voltage, other than the magnetic fluid that increases its shearing coefficient or shearing force as it is magnetized. Therefore, the stimulus generating member may be a heater, a light-emitting element, an electrode, or the like, other than the electromagnet. In addition, the twin-clutch device according to the aspects of the invention is not only used as a clutch for changing gears or shift ranges but also a clutch that switches between forward and reverse running modes. Furthermore, the transmission provided subsequent to the clutch device according to the aspects of the invention does not need to have a configuration that changes forward two-speed gears. The transmission may be configured to set speed ratios having an appropriate number of gear speeds or to continuously change speed ratios. Moreover, the three rotating members according to the aspects of the invention may be arranged so as to axially face one another instead of being arranged so as to radially face one another.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A twin-clutch device comprising:
a first rotating member, a second rotating member, and a third rotating member,
wherein
the twin-clutch device selectively transmits torque from the first rotating member to any one of or both of the second rotating member and the third rotating member,
the second rotating member and the third rotating member are arranged respectively on both sides of the first rotating member,
a functional fluid fills gaps between the first rotating member and the second rotating member and third rotating member, wherein the functional fluid decreases flowability of the functional fluid as a stimulus applied to the functional fluid is increased, and increases flowability of the functional fluid as the applied stimulus is reduced,
a stimulus generating member is provided for the first rotating member, and is electrically controlled to generate the stimulus, and
flowability of the functional fluid between the first rotating member and one of the second rotating member and the third rotating member is decreased with an increase in stimulus applied to the functional fluid by the stimulus generating member to couple the first rotating member to the one of the second rotating member and the third rotating member via the functional fluid of which the flowability is decreased, whereby allowing torque to be transmitted between the first rotating member and the one of the second rotating member and the third rotating member,
the functional fluid includes a magnetic fluid that increases shearing coefficient of the magnetic fluid or shearing force of the magnetic fluid as the magnetic fluid is magnetized,
the stimulus generating member includes an electromagnet, and
a permanent magnet is provided for one of the second rotating member and the third rotating member at a portion facing the electromagnet, and a magnetic material is provided for the other one of the second rotating member and the third rotating member at a portion facing the electromagnet.

2. The twin-clutch device according to claim 1, wherein the one of the second rotating member and the third rotating member is coupled to a low-speed side transmission mechanism having a relatively large speed ratio, and the other one of the second rotating member and the third rotating member is coupled to a high-speed side transmission mechanism having a relatively small speed ratio, the relatively large speed ratio being higher than the relatively small speed ratio.

3. The twin-clutch device according to claim 1, wherein a current control unit is provided for the twin-clutch device, and reverses a direction of electric current supplied to the electromagnet.

4. The twin-clutch device according to claim 1, wherein when torque transmission is initiated from a state where the electromagnet is not energized and no torque is transmitted between the rotating members, the electromagnet is energized so as to generate a magnetic flux in a direction to demagnetize a residual magnetism in the magnetic fluid due to the permanent magnet.

5. The twin-clutch device according to claim 1, wherein the magnetic fluid is any one of a magnetic powder and a magnetic fluid that mixes magnetic powder particles with oil.

6. A twin-clutch device comprising:
a first rotating member, a second rotating member, and a third rotating member,
wherein
the twin-clutch device selectively transmits torque from the first rotating member to any one of or both of the second rotating member and the third rotating member,
the second rotating member and the third rotating member are arranged respectively on both sides of the first rotating member,
a functional fluid fills gaps between the first rotating member and the second rotating member and third rotating member, wherein the functional fluid decreases flowability of the functional fluid as a stimulus applied to the functional fluid is increased, and increases flowability of the functional fluid as the applied stimulus is reduced,
a stimulus generating member is provided for the first rotating member, and is electrically controlled to generate the stimulus, and
flowability of the functional fluid between the first rotating member and one of the second rotating member and the third rotating member is decreased with an increase in stimulus applied to the functional fluid by the stimulus generating member to couple the first rotating member to the one of the second rotating member and the third rotating member via the functional fluid of which the flowability is decreased, whereby allowing torque to be transmitted between the first rotating member and the one of the second rotating member and the third rotating member, the functional fluid includes a magnetic fluid that increases shearing coefficient of the magnetic fluid or shearing force of the magnetic fluid as the magnetic fluid is magnetized, the stimulus generating member includes an electromagnet, the electromagnet is constructed so that a coil is arranged in a yoke made of a non-magnetic material, the second rotating member and the third rotating member respectively include permanent magnets that face the electromagnet and that have the same direction of a magnetic pole, and a current control unit that reverses a direction of electric current supplied to the coil is provided for the twin-clutch device.

7. The twin-clutch device according to claim 6, wherein the magnetic fluid is any one of a magnetic powder and a magnetic fluid that mixes magnetic powder particles with oil.

8. A power transmission mechanism comprising:
the twin-clutch device according to claim 1;
a first counter shaft that is arranged to be engageable with the second rotating member;
a second counter shaft that is arranged to be engageable with the third rotating member; and
an output shaft that is arranged to be engageable with the first counter shaft or the second counter shaft.

9. A method of controlling a twin-clutch device that includes a first rotating member, a second rotating member to which torque is transmitted from the first rotating member, a third rotating member to which torque is transmitted from the first rotating member and which is provided on an opposite side to the second rotating member with respect to the first rotating member, a functional fluid that fills gaps between the first rotating member and the second rotating member and third rotating member and that decreases flowability of the functional fluid as a stimulus applied to the functional fluid is increased and that increases flowability of the functional fluid as the applied stimulus is reduced, and a stimulus generating member that is provided for the first rotating member and that is electrically controlled to generate the stimulus, the method comprising:

applying the stimulus to the functional fluid by the stimulus generating member so as to decrease flowability of the functional fluid between the first rotating member and one of the second rotating member and the third rotating member; and coupling the first rotating member to the one of the second rotating member and the third rotating member via the functional fluid of which the flowability is decreased, whereby allowing torque to be transmitted between the first rotating member and the one of the second rotating member and the third rotating member, wherein the functional fluid includes a magnetic fluid that increases shearing coefficient of the magnetic fluid or shearing force of the magnetic fluid as the magnetic fluid is magnetized, the stimulus generating member includes an electromagnet, wherein the method further comprising, providing a permanent magnet for one of the second rotating member and the third rotating member at a portion facing the electromagnet, and providing a magnetic material for the other one of the second rotating member and the third rotating member at a portion facing the electromagnet.

10. A method of controlling a twin-clutch device that includes a first rotating member, a second rotating member to which torque is transmitted from the first rotating member, a third rotating member to which torque is transmitted from the first rotating member and which is provided on an opposite side to the second rotating member with respect to the first rotating member, a functional fluid that fills gaps between the first rotating member and the second rotating member and third rotating member and that decreases flowability of the functional fluid as a stimulus applied to the functional fluid is increased and that increases flowability of the functional fluid as the applied stimulus is reduced, and a stimulus generating member that is provided for the first rotating member and that is electrically controlled to generate the stimulus, the method comprising:

applying the stimulus to the functional fluid by the stimulus generating member so as to decrease flowability of the functional fluid between the first rotating member and one of the second rotating member and the third rotating member; and coupling the first rotating member to the one of the second rotating member and the third rotating member via the functional fluid of which the flowability is decreased, whereby allowing torque to be transmitted between the first rotating member and the one of the second rotating member and the third rotating member, wherein the functional fluid includes a magnetic fluid that increases shearing coefficient of the magnetic fluid or shearing force of the magnetic fluid as the magnetic fluid is magnetized, the stimulus generating member includes an electromagnet, the electromagnet is constructed so that a coil is arranged in a yoke made of a non-magnetic material, wherein the method further comprising, providing the second rotating member and the third rotating member respectively with permanent magnets that face the electromagnet and that have the same direction of a magnetic pole, and reversing a direction of electric current supplied to a coil.

11. A power transmission mechanism comprising:
the twin-clutch device according to claim 6;
a first counter shaft that is arranged to be engageable with the second rotating member;
a second counter shaft that is arranged to be engageable with the third rotating member; and
an output shaft that is arranged to be engageable with the first counter shaft or the second counter shaft.

* * * * *